(12) United States Patent
Yuan et al.

(10) Patent No.: US 7,188,050 B2
(45) Date of Patent: Mar. 6, 2007

(54) METHOD AND APPARATUS FOR DETECTING OUT-OF-RANGE CONDITIONS IN POWER GENERATION EQUIPMENT OPERATIONS

(75) Inventors: Chao Yuan, Plainsboro, NJ (US); Claus Neubauer, Monmouth Junction, NJ (US); Zehra Cataltepe, Red Bank, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/197,270

(22) Filed: Aug. 4, 2005

(65) Prior Publication Data

US 2006/0048007 A1 Mar. 2, 2006

Related U.S. Application Data

(60) Provisional application No. 60/604,393, filed on Aug. 25, 2004.

(51) Int. Cl.
*G06F 11/00* (2006.01)
*G06F 15/00* (2006.01)

(52) U.S. Cl. .......................... 702/183; 702/35; 702/188
(58) Field of Classification Search ........ 702/182–183, 702/185, 188, 35–36, 32; 714/26; 706/2, 706/12, 14, 15; 700/30–32
See application file for complete search history.

(56) References Cited

U.S. PATENT DOCUMENTS

| 5,223,207 A | 6/1993 | Gross et al. |
| 5,410,492 A | 4/1995 | Gross et al. |
| 5,459,675 A | 10/1995 | Gross et al. |
| 5,586,066 A | 12/1996 | White et al. |
| 5,629,872 A | 5/1997 | Gross et al. |
| 5,680,409 A | 10/1997 | Qin et al. |
| 5,745,382 A | 4/1998 | Vilim et al. |

(Continued)

FOREIGN PATENT DOCUMENTS

WO 2004059399 5/2006

OTHER PUBLICATIONS

Kai, Goebel et al.: "Rapid detection of faults for safety critical aircraft operation," Aerospace Conference 2004 Proceedings, 2004 IEEE Big Sky, MT. USA Mar. 6-13, 2004, Piscataway, NJ, USA, IEEE, US Mar. 6, 2004 pp. 3372-3383, XP010748456 ISBN: 0-7803-8155-6.

(Continued)

*Primary Examiner*—Bryan Bui
(74) *Attorney, Agent, or Firm*—Michele L. Conover (57) ABSTRACT

A method and apparatus for detecting out-of-range conditions representing normal operations is disclosed. A support vector machine is used to generate an improved representation of historical training data from power generation equipment that facilitates a more accurate determination of the boundary between measurements that should be considered faults and those that represent normal operating conditions. The SVM receives data collected from a plurality of independent sensors associated with the power generating equipment in order to generate a boundary substantially separating a first class of data (e.g., a fault) from a second class of data (e.g., a normal operating condition) in a support vector machine feature space. Elements of operational data are collected and compared to the boundary generated from historical training data. A determination is then made whether the element of operational data is in a particular class, such as a class associated with out-of-range conditions.

36 Claims, 4 Drawing Sheets

U.S. PATENT DOCUMENTS

| | | |
|---|---|---|
| 5,761,090 A | 6/1998 | Gross et al. |
| 5,764,509 A | 6/1998 | Gross et al. |
| 5,774,379 A | 6/1998 | Gross et al. |
| 5,987,399 A | 11/1999 | Wegerich et al. |
| 6,107,919 A | 8/2000 | Wilks et al. |
| 6,119,111 A | 9/2000 | Gross et al. |
| 6,131,076 A | 10/2000 | Stephan et al. |
| 6,181,975 B1 | 1/2001 | Gross et al. |
| 6,202,038 B1 | 3/2001 | Wegerich et al. |
| 6,240,372 B1 | 5/2001 | Gross et al. |
| 6,245,517 B1 | 6/2001 | Chen et al. |
| 6,609,036 B1 | 8/2003 | Bickford |
| 6,618,690 B1 * | 9/2003 | Syrjarinne .................. 702/179 |
| 6,625,569 B2 | 9/2003 | James et al. |
| 6,892,163 B1 | 5/2005 | Herzog et al. |
| 2001/0049590 A1 | 12/2001 | Wegerich |
| 2003/0101162 A1 | 5/2003 | Ferguson et al. |
| 2003/0218321 A1 * | 11/2003 | Suzuki et al. ............ 280/730.1 |
| 2004/0002776 A1 | 1/2004 | Bickford |
| 2004/0006398 A1 | 1/2004 | Bickford |

OTHER PUBLICATIONS

European Search Report.

* cited by examiner

METHOD AND APPARATUS FOR DETECTING OUT-OF-RANGE CONDITIONS IN POWER GENERATION EQUIPMENT OPERATIONS

This patent application claims the benefit of U.S. Provisional Application No. 60/604,393, filed Aug. 25, 2004, which is hereby incorporated by reference herein in its entirety.

BACKGROUND OF THE INVENTION

Large machinery, such as power generation equipment, is typically very expensive to purchase, install, maintain and operate. Accordingly, determining whether such equipment is operating within desired operating parameters is important. Detecting conditions that indicate that the equipment is operating outside these desired parameters, which may result in damage to the equipment is, therefore, also important. In order to detect such conditions, sensors are typically used to measure operating parameters, such as pressure, temperature, etc., of various components and, if a predetermined threshold for a particular parameter is crossed by a particular measurement, a fault is declared. Recently, learning techniques for fault detection systems have become more prevalent in attempts to improve the accuracy of determining whether a fault exists. Well-known techniques, such as neural networks, multivariate state estimation techniques (MSET) and fuzzy logic have been used for such purposes. All such methods use historical data, indicative of past normal operations and fault conditions, to monitor future data generated by operations of the equipment. If the future data deviates too much from the historical data model, an alarm is generated and a fault is declared.

While prior fault detection methods were advantageous in many implementations, they were also disadvantageous in certain regards. Specifically, these prior fault detection methods typically relied on historical data to generate estimates of the boundaries between data measurements that could be considered faults and those measurements that could be considered normal operating conditions. However, these boundary estimates were typically relatively inaccurate. Therefore, due to this inaccuracy, these methods could potentially identify system faults as normal operating conditions. Similarly, a normal operating condition could be classified as a fault simply because it was not previously observed in the historical data. Such normal, not previously observed conditions are referred to herein as out-of-range conditions.

SUMMARY OF THE INVENTION

The present inventors have invented a method and apparatus for detecting out-of-range conditions representing normal operations. Specifically, the present invention uses a Support Vector Machine (SVM), described further herein below, to generate an improved representation of historical training data from power generation equipment that facilitates a more accurate determination of the boundary between measurements that should be considered faults and those that represent normal operating conditions. In one embodiment, a method is disclosed whereby an SVM is used to receive data collected from a plurality of independent sensors associated with the power generating equipment in order to generate a boundary substantially separating a first class of data (e.g., a fault) from a second class of data (e.g., a normal operating condition) in a support vector machine feature space. Elements of operational data are collected and compared to the boundary generated from historical training data. A determination is then made whether the element of operational data is in a particular class, such as a class associated with faults.

In another embodiment, a method for detecting faults in power generation equipment is disclosed whereby a set of training data, comprising measurements of operational characteristics of said power generation equipment, is used to train a support vector machine. A class is assigned to each element of data in said training data and a boundary substantially separating different classes is generated.

DETAILED DESCRIPTION

As discussed above, data associated with the operation of power generation equipment can be collected by sensors placed at desired locations on that equipment. For example, where power generation equipment uses turbine engines as a component in the power generation process, pressure and temperature may be measured at various points in the engine. The sensors at these points can be classified into two separate groups: independent sensors, which measure an input to the engine, and dependent sensors, which measure operational data associated with internal engine processes or the output of the engine. For example, inlet gas flow and inlet temperature are input measurements taken by input sensors. Since input measurements are the starting point for the processes performed by the engine, input sensors are also referred to herein as "process driver sensors." Measurements taken by input sensors cannot determine whether a fault exists with the power generation equipment as such sensors are independent of any operation of the equipment. Thus, measurements taken by input sensors can only represent in range conditions, herein defined as input conditions that have been observed previously, or out-of-range conditions, herein defined as input conditions that have not been observed previously. Dependent sensors, on the other hand, take measurements that are dependent upon the input conditions measured by the independent sensors, such as the aforementioned inlet gas flow and inlet temperature. Dependent sensors can be used to detect conditions that may indicate faults have occurred in the power generation equipment itself. For example, sensors measuring the temperature of the internal turbine blades while in operation are dependent sensors since the measurements they make will be dependent upon the inlet gas flow and temperature.

Figure 1:
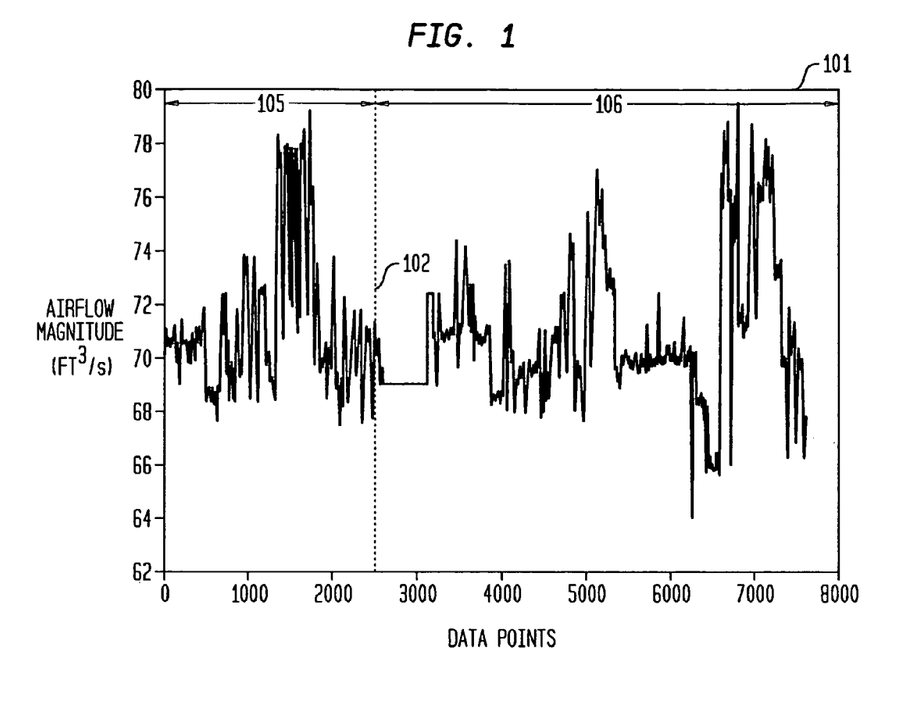
FIG. 1 shows a one dimensional graph of an input space for measurements of inlet gas flow in a turbine engine.
Figure 2:
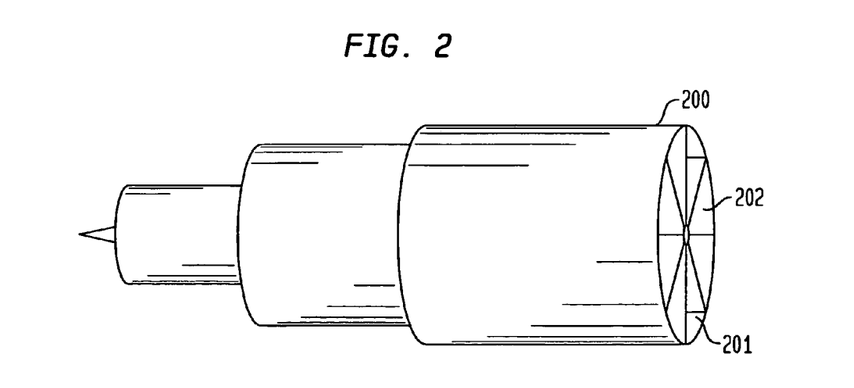
FIG. 2 shows a turbine engine for which the measurements of FIG. 1 are taken.

FIG. 1 shows a graph of data collected by an independent sensor, such as a sensor measuring the input gas flow at an inlet of a turbine engine used to generate power. Specifically, FIG. 1 represents the measurements of input gas flow at point 202 at the inlet 201 of turbine engine 200 in FIG. 2. Referring once again to FIG. 1, graph 101 shows a plot 102 of approximately 7600 measurements of the gas flow in cubic feet per second at point 201 in FIG. 2. The plot 102 of FIG. 1 is also referred to as an input space since it is a one dimensional representation of the inlet gas flow. As one skilled in the art will recognize, this data, or a portion of this data, may be used to estimate and characterize future operational measurements. Specifically, historical data can be used to determine an estimated desired operational range. Future operational gas flow measurements can then be compared to this range to determine whether those measurements are within or outside of the desired operational limits.

As one skilled in the art will recognize, an operating range of a particular operational characteristic of power generation equipment, such as the inlet gas flow of such power generation equipment, can be determined by estimating an upper and lower boundary representing the highest and lowest measurements of inlet gas flow taken by one or more sensors on that equipment. This range can then be used as a decision mechanism to classify future data measurements of inlet gas flow in operations. When used in conjunction with a monitoring system that functions to monitor operations of the power generating equipment, developing a range that can be used as such a decision mechanism is referred to herein as training the monitoring system. Specifically, if a measurement of the inlet gas flow of power generation equipment is outside the upper or lower boundary, then that measurement could be classified as a fault. For example, referring to FIG. 1, if the first 2500 measurements (e.g., those measurements in area 105 in FIG. 1 of the inlet gas flow of a turbine engine are used to determine such a range, then the remaining 5100 measurements (i.e., those measurements in area 106 in FIG. 1), which may represent operational data measurements, can be compared to the range established by the first 2500 measurements. Here, using the data represented by the first 2500 measurements in FIG. 1, the estimated operating range of the inlet gas flow would be from 67 cubic feet per second (the lowest inlet gas flow measured) to 79 cubic feet per second (the highest inlet gas flow measured). In such a case, in operations, if a measurement exceeds the 79 cubic feet per second or falls below 67 cubic feet per second, the measurement could be declared a fault. However, as one skilled in the art will recognize, being outside of such a relatively simplistically derived operating range may be a relatively inaccurate measure of whether a fault should be declared and can result in faults going unrecognized or can result in out-of-range conditions being declared a fault.

Figure 3:
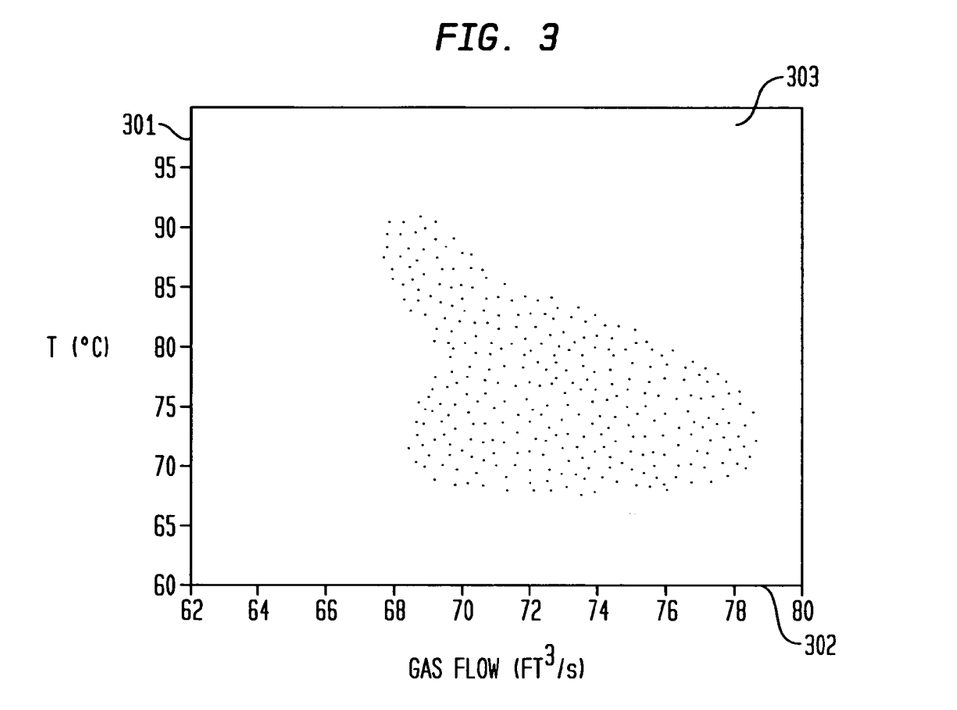
FIG. 3 shows a two dimensional graph of a feature space whereby the inlet gas flow is represented as a function of inlet temperature of the turbine engine.

In many cases a more accurate representation of a desired operational range can be obtained by mapping the observed measurements as a function of one or more additional variables. For example, FIG. 3 is a mapping of the first 2500 observed inlet airflow measurements from the input space of FIG. 1 onto a higher-dimension feature space 303, defined by the vertical axis 301 and horizontal axis 302, as a function of the inlet temperature in degrees Celsius at the time those measurements were taken. As can be seen by FIG. 3, instead of using a simple one-dimensional range of inlet gas flow measurements as a decision mechanism, the measurements on the feature space form a two-dimensional area that is a function of both the inlet gas flow and inlet temperature. Each two-dimensional measurement, consisting of an inlet temperature measurement and an inlet gas flow measurement, is referred to herein as a vector. Since these vectors are two dimensional, a determination of whether a measurement of operational data should be considered a fault may be more accurately made relative to a one-dimensional data measurement. This is because, instead of just characterizing the inlet gas flow as a range of gas flow values, the range is further constrained by specific temperature values. An inlet gas flow measurement within the range of desired operational gas flow values as determined from the first 2500 data points in FIG. 1 may still be a fault if the inlet temperature is outside of a desired temperature range. One skilled in the art will recognize that any number of dimensions can be used to create a higher dimension volume for making such fault determinations.

Regardless the dimensions used, the key to enabling increased accuracy in detecting faults is to accurately determine the boundary of the area formed by the mapping of data, such as the inlet gas flow and temperature data discussed previously, from the input space (e.g., of FIG. 1) to a higher dimension feature space (such as that of FIG. 3). The present inventors have recognized, therefore, that it is highly desirable to be able to monitor power generation equipment with the use of a support vector machine (SVM). An SVM is an algorithm that is capable of determining boundaries in a historical data pattern with a high degree of accuracy. As is known in the art, SVMs are supervised learning algorithms developed initially by Vladimir Vapnik (see, e.g., V. Vapnik, *Statistical Learning Theory*, John Wiley, NY, N.Y., 1998; and Cristianini and Shawe-Taylor, *An Introduction to Support Vector Machines,* 2000). SVMs address the general problem of learning to discriminate between classes or between sub-class members of a given class of vectors. The SVM algorithm operates by mapping a training set of data in an input space, such as historical operating data, into a feature space and by then locating in that space a plane, or boundary, that separates the different classes and/or subclasses of data. Once an SVM has determined such a plane/boundary, the SVM can then predict the classification of a new vector that was not part of the training data by mapping it into the feature space and determining on which side of the separating boundary the example lies. SVMs have been found to be much more accurate than prior methods of classifying data due to the SVM's ability to select an optimal separating boundary when many candidate boundaries exist. In particular, the SVM determines the boundary between a training set of data that maintains a maximum margin from one class to another in the training set of data. Such a determination of the choice of the maximum margin boundary leads to optimal prediction of the classification of previously unseen examples (V. Vapnik, *Statistical Learning Theory,* John Wiley, NY, N.Y., 1998). SVMs are generally well known and the theory behind the development and use of such SVMs will not be discussed further herein.

One illustrative embodiment of the present invention uses an SVM to develop a boundary around the data mapped into a feature space as is shown in FIG. 3. In training an SVM, an algorithm f(x) is developed based on the training data that gives confidence to an input vector x being in the range defined by the training data. The function f(x) is the boundary that defines the decision region R={x:f(x)≧T}, where T is the decision threshold such that an input vector x is classified as being within the decision region if f(x)≧T and is classified as being outside the decision region if f(x)<T. In particular f(x) is defined as being the inner product:

$$f(x) = h^T \Phi(x)$$ (Equation 1)

where $\Phi(x)$ is a the mapping from the input space to the feature space; h is the solution vector in the feature space and, once again, T is the decision threshold. This mapping function from the input space to the feature space may be complex, depending upon the dimensionality of the feature space. However the explicit function of this mapping is unnecessary with the use of an SVM because the algorithm that finds a separating boundary in the feature space can be stated entirely in terms of vectors in the input space and dot products in the feature space. Therefore, an SVM can locate the boundary without ever representing the space explicitly, simply by defining a function, called a kernel function, that plays the role of a dot product in the feature space. This technique avoids the computational burden of explicitly representing the vectors in the potentially highly-dimensional feature space. Here, illustratively, the Gaussian kernel:

$$\exp\left(\frac{\|x_i - x_j\|^2}{2\sigma^2}\right)$$ (Equation 2)

may be used as the kernel function, where $x_i$ and $x_j$ are any two vectors in the input space and $\sigma$ is the width of the Gaussian kernel. Using the kernel function of Equation 2, the SVM minimizes the boundary of the volume of the decision region such that the false alarm rate is greatly reduced. Using such an SVM, out-of-range detection is also greatly enhanced. Specifically, in order to determine whether an out-of-range condition exists for the data collected at the independent sensors on power generation equipment, the evaluation function of Equation 1 is calculated and, if f(x)≧T=1, x is determined to be in range. Otherwise, x is out-of-range.

Figure 4:
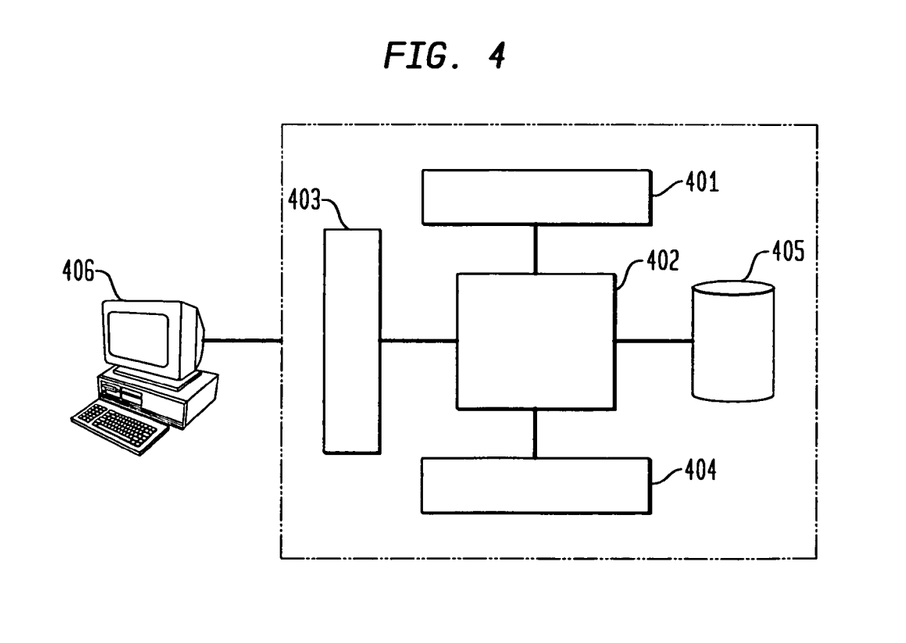
FIG. 4 shows a diagram of a computer that may perform support vector machine calculations in accordance with the principles of the present invention.

One skilled in the art will recognize that a monitoring system using an SVM such as that discussed above may be implemented on a programmable computer adapted to perform the steps of a computer program to calculate the functions of the SVM. Referring to FIG. 4, such a monitoring system 400 may be implemented on any suitable computer adapted to receive, store and transmit data such as the aforementioned phonebook information. Specifically, illustrative monitoring system 400 may have, for example, a processor 402 (or multiple processors) which controls the overall operation of the monitoring system 400. Such operation is defined by computer program instructions stored in a memory 403 and executed by processor 402. The memory 403 may be any type of computer readable medium, including without limitation electronic, magnetic, or optical media. Further, while one memory unit 403 is shown in FIG. 4, it is to be understood that memory unit 403 could comprise multiple memory units, with such memory units comprising any type of memory. Monitoring system 400 also comprises illustrative modem 401 and network interface 404. Monitoring system 400 also illustratively comprises a storage medium, such as a computer hard disk drive 405 for storing, for example, data and computer programs adapted for use in accordance with the principles of the present invention as described hereinabove. Finally, monitoring system 400 also illustratively comprises one or more input/output devices, represented in FIG. 4 as terminal 406, for allowing interaction with, for example, a technician or database administrator. One skilled in the art will recognize that address monitoring system 400 is merely illustrative in nature and that various hardware and software components may be adapted for equally advantageous use in a computer in accordance with the principles of the present invention.

Figure 5:
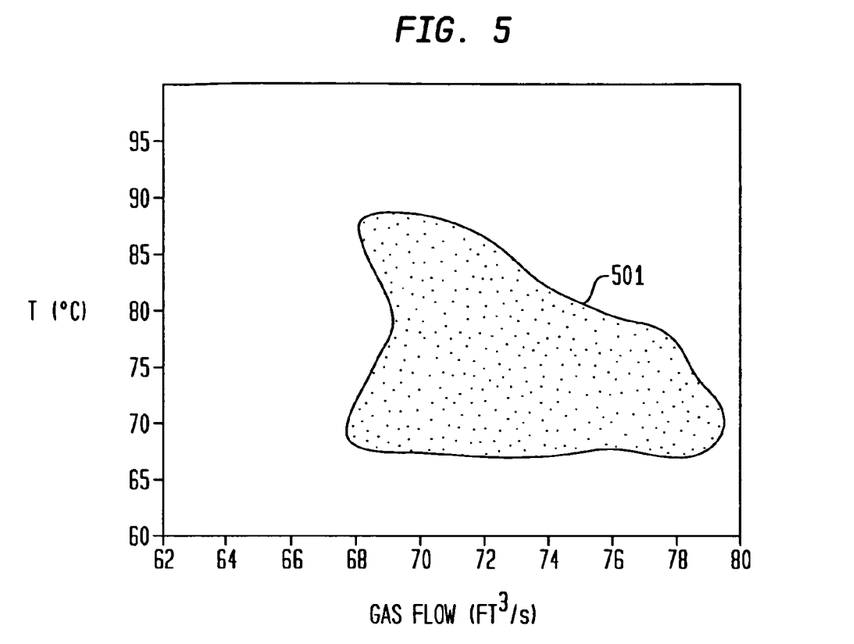
FIG. 5 shows the two dimensional graph of FIG. 3 showing a boundary calculated by an SVM and enclosing a decision region.
Figure 6:
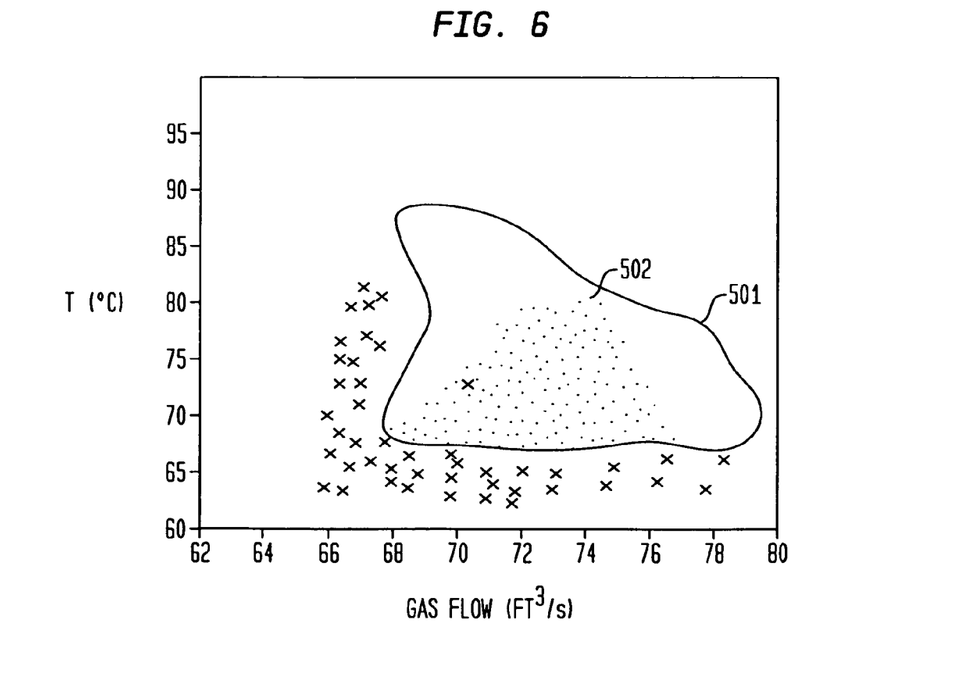
FIG. 6 shows the decision region of FIG. 5 in relation to operational data and how that operational data can be classified using such a decision region.

FIG. 5 shows the boundary 501 calculated by the SVM described above based upon the training data of the first 2500 data points in FIG. 1. This boundary represents a decision region based on the desired operational characteristics of the power generation equipment. By comparing the operational data to the boundary of the decision region generated by the SVM using the training data, the operational data can thus be classified as within or outside of the decision region. FIG. 6 shows how the remaining 5100 non-training data points of FIG. 1 compared to the decision region and boundary of FIG. 5. Since the data represented in FIG. 5 is collected by independent sensors, such as at point 202 in FIG. 2, the data inside decision region 502 bound by boundary 501 are classified as in-range data and the data outside the region 502 are classified as out-of-range.

Figure 7:
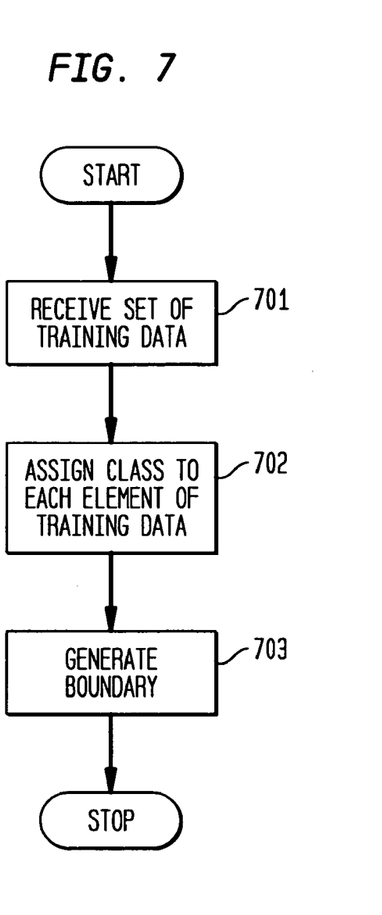
FIG. 7 is an illustrative flow chart showing exemplary steps of a method in accordance with one embodiment of the present invention.

FIG. 7 shows a flow chart of a method in accordance with the principles of the present invention. At step 701, a set of training data comprising measurements of operational characteristics of power generation equipment is received. This training data may comprise measurements of operational characteristics of said power generation equipment. Next, at step 702, a class is assigned to each element of data in said training data. Finally, at step 703, a boundary in a feature space is generated that separates training data assigned to one class from training data assigned from other classes.

Figure 8:
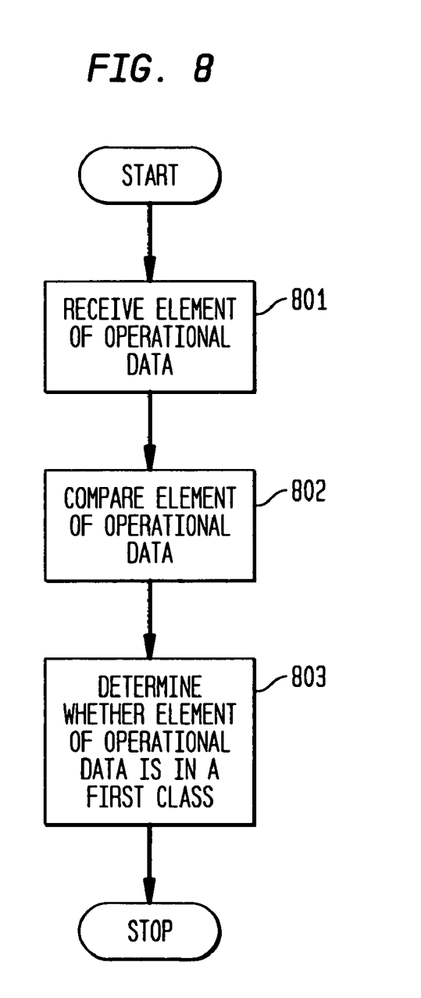
FIG. 8 is another illustrative flow chart showing the exemplary steps of a method in accordance with another embodiment of the present invention.

FIG. 8 shows another flowchart in accordance with the principles of the present invention. Specifically, at step 801, an element of operational data is collected and at step 802, that element is compared to the boundary. Finally, at step 803, it is determined whether the element of operational data is in said first class of data.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting out-of-range conditions in an apparatus having a monitoring system, said monitoring system storing a support vector machine feature space having a boundary substantially separating a first class of data from a second class of data, said method comprising:

receiving an element of operational data from an independent sensor associated with said apparatus;

comparing said element of operational data to said boundary;

if said element of operational data is within said second class of data, determining that said element of operational data represents an out-of-range condition for said apparatus; and issuing an alarm to indicate a fault occurs.

2. The method of claim 1 wherein said apparatus comprises power generation equipment.

3. The method of claim 1 wherein said support vector machine generates said boundary from a plurality of elements of training data.

4. The method of claim 1 wherein said element of operational data comprises data collected by one sensor in a plurality of sensors, said one sensor positioned at one location in a plurality of locations on said apparatus.

5. The method of claim 4 wherein said one location in said plurality of locations on said apparatus comprises a location of an independent sensor.

6. The method of claim 1 wherein said element of operational data comprises a vector.

7. The method of claim 1 wherein said second class is a class assigned to training data that is out of a normal operating range of said apparatus.

8. The method of claim 1 wherein said first class is a class assigned to data that is within a normal operating range of said apparatus.

9. A method for detecting out-of-range conditions in an apparatus comprising:

receiving a set of training data collected by one or more independent sensors, said training data comprising measurements of operational characteristics of said apparatus;

assigning a class to each element of data in said training data;

generating a boundary in a feature space, said boundary substantially separating training data assigned to one class from training data assigned to other classes, wherein said other classes are classes associated with training data that is out of a normal operating range of said apparatus; and storing said boundary in memory.

10. The method of claim 9 wherein said apparatus comprises power generation equipment.

11. The method of claim 9 wherein said measurements comprise data elements collected by a plurality of sensors positioned at a plurality of locations on said apparatus.

12. The method of claim 9 further comprising:

collecting an element of operational data;

comparing said element of operational data to said feature space; and determining whether said element of operational data is in said one class.

13. The method of claim 12 wherein said step of determining whether said element of operational data is in said one class comprises:

determining whether said element of operational data represents an out-of-range condition for said apparatus.

14. The method of claim 9 wherein each sensor in said plurality of sensors comprises an independent sensor.

15. The method of claim 9 wherein said training data comprises a plurality of vectors.

16. The method of claim 9 wherein said step of generating comprises estimating said boundary using a Gaussian kernel.

17. The method of claim 16 wherein said Gaussian kernel is defined as:

$$\exp\left(\frac{-\|x_i - x_j\|^2}{2\sigma^2}\right)$$

where $x_i$ and $x_j$ are two vectors in the input space and $\sigma$ is the width of the Gaussian kernel.

18. The method of claim 9 wherein said one class is a class assigned to training data that is within a normal operating range of said apparatus.

19. An apparatus for detecting out-of-range conditions in equipment having a monitoring system, said monitoring system adapted to store a support vector machine feature space having a boundary substantially separating a first class of data from a second class of data, said apparatus comprising:

means for receiving an element of operational data from an independent sensor associated with said equipment;

means for comparing said element of operational data to said boundary; and means for determining that said element represents an out-of-range condition for said equipment if said element of operational data is in said second class.

20. The apparatus of claim 19 wherein said equipment comprises power generation equipment.

21. The apparatus of claim 19 wherein said support vector machine is adapted to generate said boundary from a plurality of elements of training data.

22. The apparatus of claim 19 wherein said element of operational data comprises data collected by one sensor in a plurality of sensors, said one sensor positioned at one location in a plurality of locations on said equipment.

23. The apparatus of claim 22 wherein said one location in said plurality of locations on said equipment comprises a location of an independent sensor.

24. The apparatus of claim 19 wherein said element of operational data comprises a vector.

25. The apparatus of claim 19 wherein said second class is a class assigned to training data that is out of a normal operating range of said equipment.

26. The apparatus of claim 19 wherein said first class is a class assigned to data that is within a normal operating range of said equipment.

27. An apparatus for detecting out-of-range conditions in equipment comprising:

means for receiving a set of training data collected by one or more independent sensors, said training data comprising measurements of operational characteristics of said equipment;

means for assigning a class to each element of data in said training data; and means for generating a boundary in a feature space, said boundary substantially separating training data assigned to one class from training data assigned to other classes, wherein said other classes are classes associated with training data that is out of a normal operation range of said equipment; and means for storing said boundary in memory.

28. The apparatus of claim 27 wherein said equipment comprises power generation equipment.

29. The apparatus of claim 27 wherein said measurements comprise data elements collected by a plurality of sensors positioned at a plurality of locations on said equipment.

30. The apparatus of claim 29 wherein each sensor in said plurality of sensors comprises an independent sensor.

31. The apparatus of claim 27 further comprising:
means collecting an element of operational data;
means for comparing said element of operational data to said feature space; and
means for determining whether said element of operational data is in said one class.

32. The apparatus of claim 31 wherein said means for determining whether said element of operational data is in said one class comprises:
means for determining whether said element of operational data represents an out-of-range condition for said equipment.

33. The apparatus of claim 27 wherein said training data comprises a plurality of vectors.

34. The apparatus of claim 27 wherein said means for generating comprises means for estimating said boundary using a Gaussian kernel.

35. The apparatus of claim 34 wherein said Gaussian kernel is defined as:

$$\exp\left(\frac{-\|x_i - x_j\|^2}{2\sigma^2}\right)$$

where $x_i$ and $x_j$ are two vectors in the input space and $\sigma$ is the width of the Gaussian kernel.

36. The apparatus of claim 27 wherein said one class is a class assigned to training data that is within a normal operating range of said equipment.

* * * * *